(12) United States Patent
Meiring

(10) Patent No.: US 6,712,377 B1
(45) Date of Patent: Mar. 30, 2004

(54) LEAN-RIGHT MOTORCYCLE SUPPORT BRACE

(76) Inventor: William E. Meiring, 129 St. Clair Pl., New Bremen, OH (US) 45869

( * ) Notice: Subject to any disclaimer, the term of this patent is extended or adjusted under 35 U.S.C. 154(b) by 16 days.

(21) Appl. No.: 10/237,733

(22) Filed: Sep. 10, 2002

(51) Int. Cl.$^7$ ............................................... B62H 1/00
(52) U.S. Cl. ................................................... 280/303
(58) Field of Search ............................. 280/293–304; 248/677, 300

(56) References Cited

U.S. PATENT DOCUMENTS

| | | | |
|---|---|---|---|
| 571,979 A | * 11/1896 | Otto | 280/301 |
| 747,449 A | 12/1903 | Longbottom | |
| 862,945 A | * 8/1907 | Tiffany | 280/301 |
| 948,349 A | * 2/1910 | Settle | 280/298 |
| 3,712,637 A | * 1/1973 | Townsend | 280/293 |
| 3,712,640 A | * 1/1973 | Shipman et al. | 280/301 |
| 3,910,603 A | 10/1975 | Shipman | |
| 3,970,330 A | * 7/1976 | Norcross | 280/301 |
| 4,648,597 A | * 3/1987 | Adler | 482/61 |
| 4,834,405 A | * 5/1989 | Dimaio | 280/301 |
| 4,883,284 A | * 11/1989 | Nakazawa et al. | 280/293 |
| 5,232,237 A | * 8/1993 | Patrick | 280/293 |
| 5,351,981 A | * 10/1994 | Thomas | 280/301 |
| 5,544,763 A | * 8/1996 | McClain | 211/22 |
| 5,639,067 A | 6/1997 | Johnson | |
| 5,979,878 A | 11/1999 | Blankenship | |
| 6,257,803 B1 | * 7/2001 | McCabe et al. | 405/269 |

* cited by examiner

Primary Examiner—Lesley D. Morris
Assistant Examiner—Paul Royal, Jr.
(74) Attorney, Agent, or Firm—Richard C. Litman

(57) ABSTRACT

A lean-right steel motorcycle support brace which is removably attachable to the left side of the lower portion of a motorcycle frame. A generally flat elongated beam of steel is formed with a hook portion at one end and a circular footpad formed at a thirty degree angle to the beam at a second of the beam. The beam has elongated strengthening ribs along the beam sides. The ribs extend from a point adjacent to the hook portion to a point adjacent to the footpad. The hook is shaped to conform to the outer diameter of the tubular frame portions on the underside of a motorcycle, particularly the frame of a HARLEY DAVIDSON™ motorcycle. When properly installed, the brace temporarily supports a motorcycle in a generally upright position leaning on the brace slightly to the right for easy cleaning and servicing.

5 Claims, 5 Drawing Sheets

LEAN-RIGHT MOTORCYCLE SUPPORT BRACE

BACKGROUND OF THE INVENTION

1. Field of the Invention

The present invention relates to support stands for motorcycles and more specifically, to a portable brace for temporarily supporting a motorcycle in a generally upright position on the brace, and leaning slightly to the right.

2. Description of the Related Art

A frequent problem in the maintenance of motorcycles (particularly with large bikes such as the HARLEY DAVIDSON™) is cleaning and servicing the left side of the motorcycle because the motorcycles usually lean to the left on the support stands provided on the motorcycles.

Support stands for motorcycles in the prior art are constructed in various forms for various purposes. Stands fixed to the motorcycle like kick stands are well known for supporting parked motorcycles in a generally upright position. Portable motorcycle braces are also known in the prior art.

In the U.S. Pat. No. 3,910,603 issued Oct. 7, 1975 to Shipman, a bicycle side stand is taught for use on racing and trail motorcycles to prevent motorcycle accidents caused when kick stands affixed to the motorcycles are inadvertently jarred out of their storage positions. The Shipman stand comprises a bracket removably attached by nuts and bolts to the frame of the motorcycle and a rod removably connected to the bracket and contacting the ground for supporting the weight of the motorcycle. The rod has notches spaced along its length for cooperating with an aperture in a flange and pointed projections on the bracket. The weight of the motorcycle is rested on the rod and keeps the flange and projections engaged in the notches of the rod. The rod is removed and stored alone or in a convenient place on the motorcycle.

The nuts and bolts of the Shipman bracket are also subject to being loosened which would then cause the bicycle side stand unstable. An loosened and unstable bracket could fail and cause injury to a person doing maintenance on the motorcycle or a person installing or removing the rod, in addition to causing damage or injury to the motorcycle. Another undesirable aspect is that coordinating the size of the flange aperture, spacing of the notches and placement of the pointed projections of the Shipman bicycle side stand would appear to require a large amount of precision machining in its construction and thus prohibitive costs.

U.S. Pat. No. 747,449 issued Dec. 22, 1903 to Longbottom teaches a bicycle support in the form of an elongated brace having a series of projections on opposite faces of the brace. When the brace is tipped at an angle, the projections cooperate with the top and bottom of the rear stays of the bicycle's frame to support the bicycle in a upright position with one end of the brace in contact with the ground. An elastic loop secures the brace to the bicycle in such a manner that when the bicycle is in use the brace hangs between the rear stays above the ground.

U.S. Pat. No. 6,234,452 issued May 22, 2001 to Johnson and U.S. Pat. No. 5,979,878, issued Nov. 9, 1999 to Blankenship show various stands designed to support motorcycles.

None of the above inventions and patents, taken either singularly or in combination, is seen to describe the instant invention as claimed. Thus a lean-right motorcycle support brace solving the aforementioned problems is desired.

SUMMARY OF THE INVENTION

The present invention provides a motorcycle support brace that is removably attachable to the left side of a lower portion of a motorcycle frame. The support brace is formed of a durable material such as steel. A flat elongated beam is formed with a hook at one end and a circular ground engaging footpad at a second end. An elongated strengthening rib is formed along each side of the beam, making the central portion of the brace u-shaped in cross section. Each rib extends along a side of the beam from a point adjacent to the hook to a point adjacent to the footpad of the brace. The hook is shaped to conform to the outer diameter of the lower portion of the tubular frame of a motorcycle. The circular footpad extends at a thirty degree angle to the beam so as to rest upon a level, hard surface such as a garage floor or level driveway when the brace is in use. The portion of the beam between the hook and footpad is approximately 19.8465 inches in length. The footpad is approximately 2.16 inches in diameter and the radius of curvature of the hook is approximately 6.25 inches.

With the motorcycle sitting on a level, hard surface and resting on a jiffy stand, the hook portion of the support brace is positioned to rest on top of the left side of the lower portion of the tubular motorcycle frame. The hook portion is positioned on the frame so that none of the parts of the brace interfere with any parts of the engine, transmission or shocks of the motorcycle when the motorcycle is leaned to the right to rest on the support brace. When the motorcycle is properly rested on the support brace, the bottom of the right side of the tubular motorcycle frame rests on the upper surface of the brace and the foot portion of the support brace makes flush contact with the ground. With the motorcycle leaning to the right, ready access is provide to all of the left side of the motorcycle for cleaning and maintenance procedures. To remove the brace, the motorcycle is leaned back to the left so as to be supported securely on the jiffy stand and the hook is disengaged from the tubular motorcycle frame. The motorcycle support brace can then be stored alone or in a convenient place on the motorcycle. The brace will support up to 800 pounds of lean weight.

Accordingly, it is a principal object of the invention to provide a brace for temporarily supporting a motorcycle in a generally upright position leaning on the brace slightly to the right.

It is another object of the invention to provide brace that make cleaning and maintenance on the left side of a motorcycle easier to perform.

It is a further object of the invention to provide motorcycle brace that allows for quick and easy placement and removal upon the lower portion of the tubular frame of a motorcycle.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
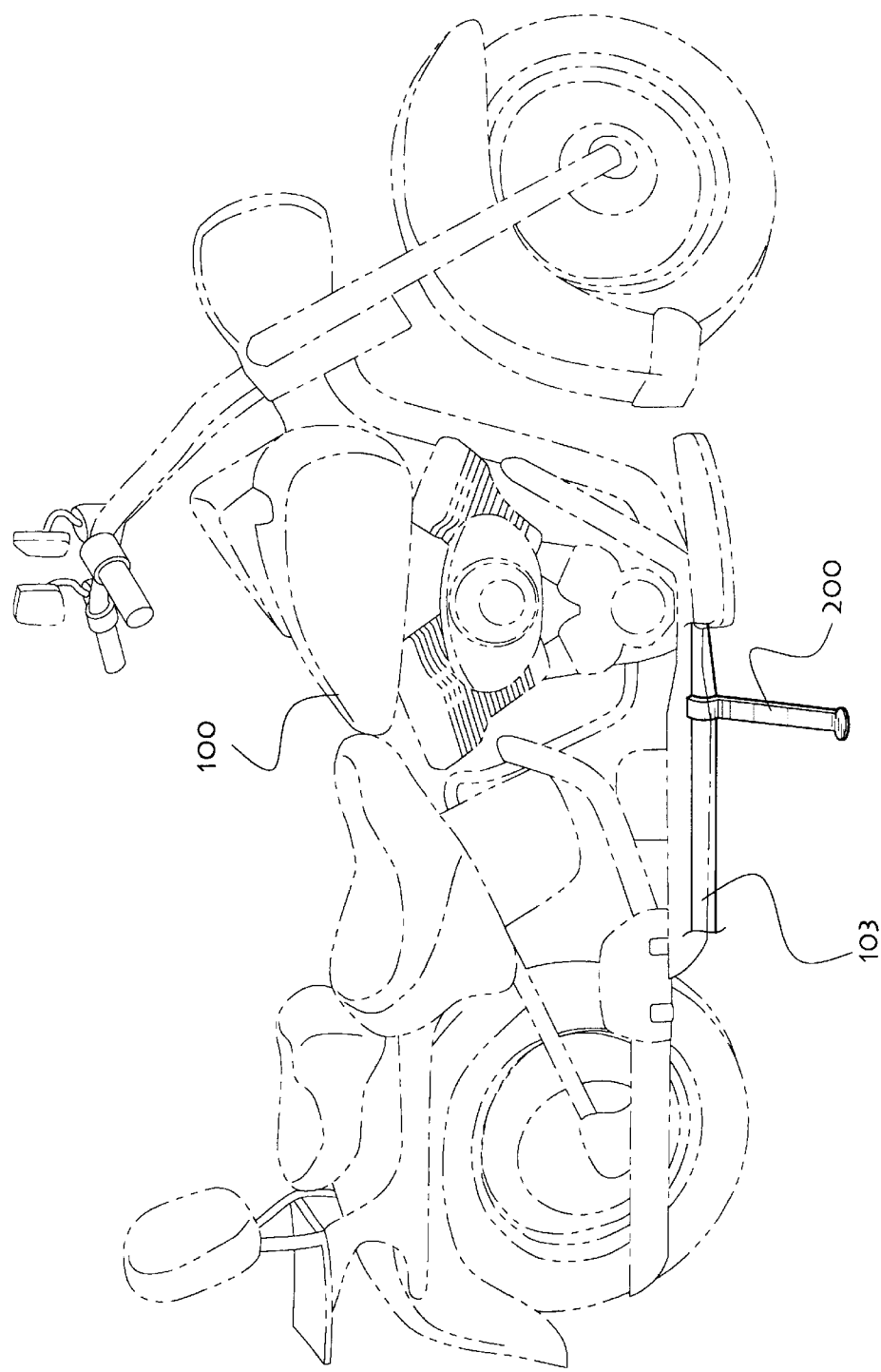
FIG. 1 is an environmental, perspective view of a motorcycle support brace according to the present invention.
Figure 2:
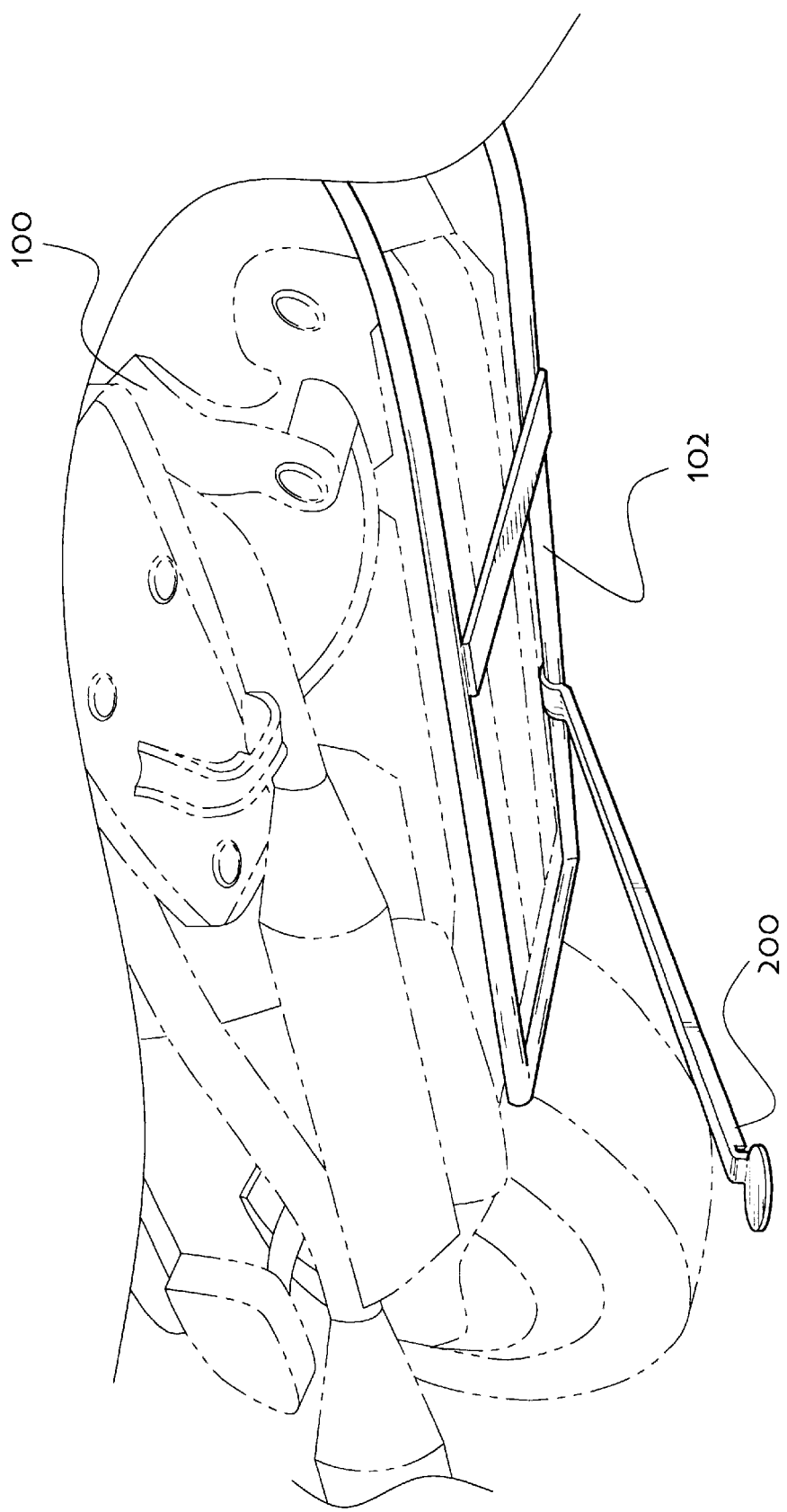
FIG. 2 is a perspective view of the motorcycle support brace of FIG. 1 according to the present invention, showing the hook attached to the top of the left side tubular frame member of a motorcycle.

The present invention is a motorcycle support brace that is removably attachable to the left side of the lower portion 102 of a tubular motorcycle frame. In FIGS. 1 and 2, the support brace 200 is shown as an integral structure which is formed of steel.

Figure 3:
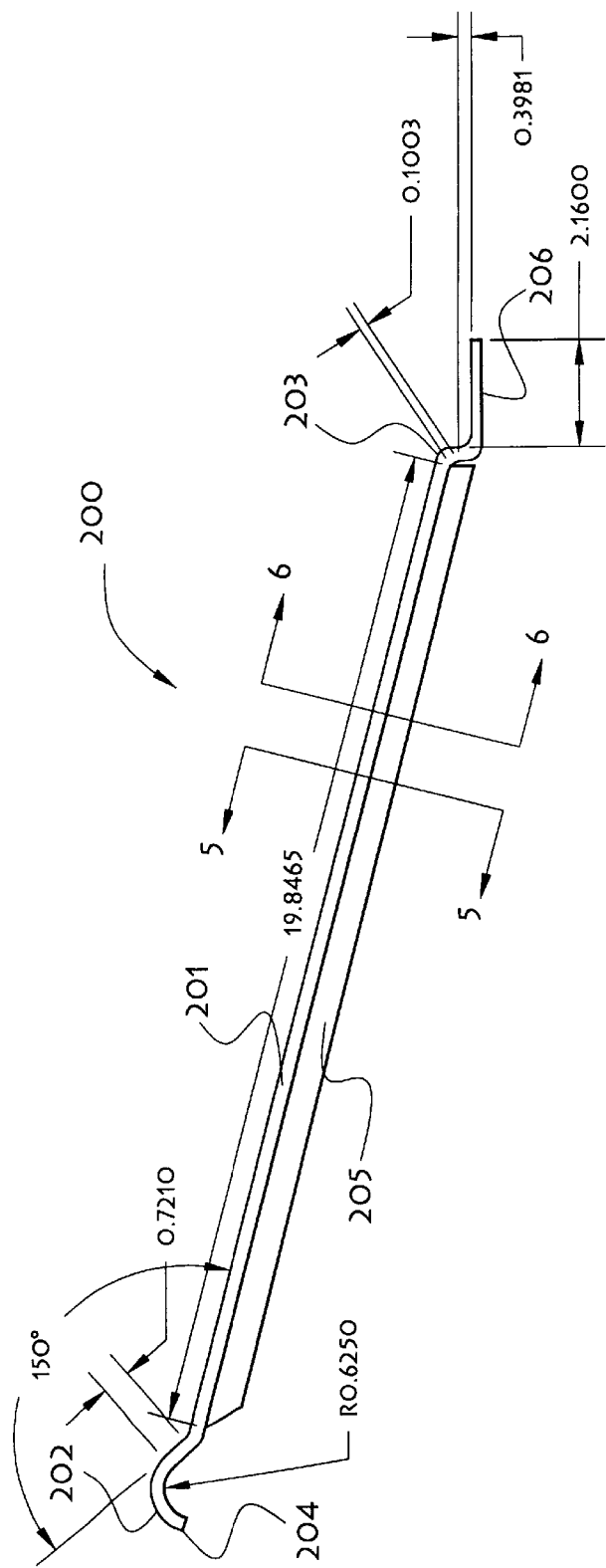
FIG. 3 is a side view of a motorcycle support brace according to the present invention.
Figure 4:
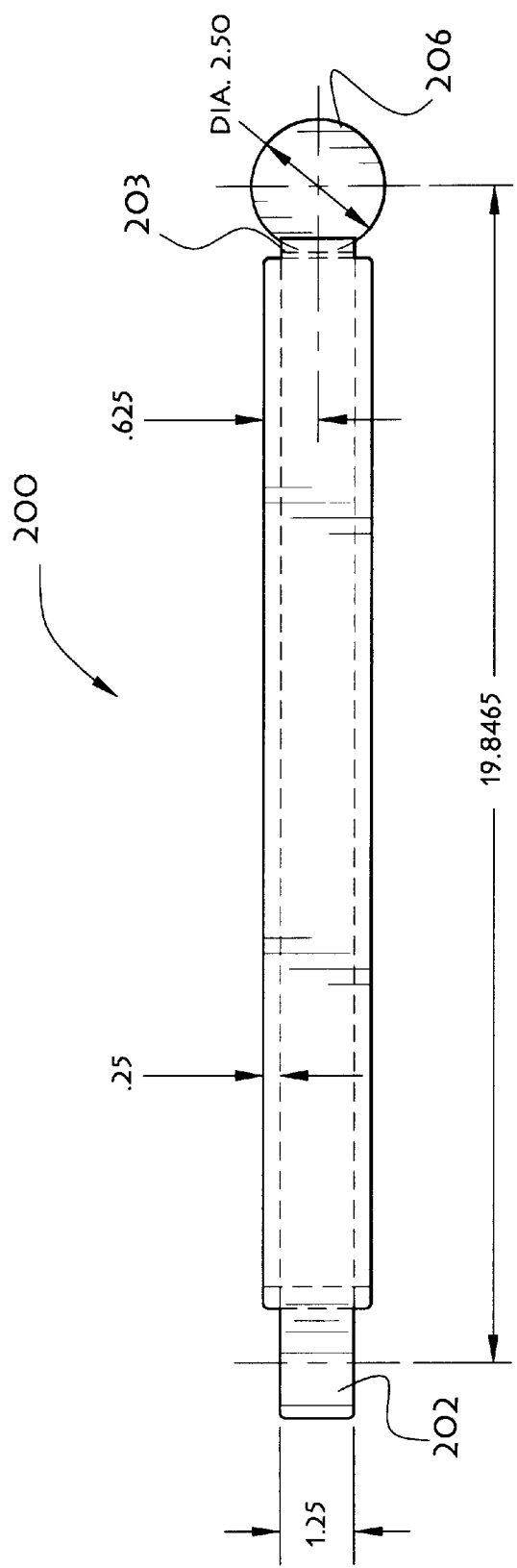
FIG. 4 is a top view of the motorcycle support brace shown in FIG. 3.
Figure 6:
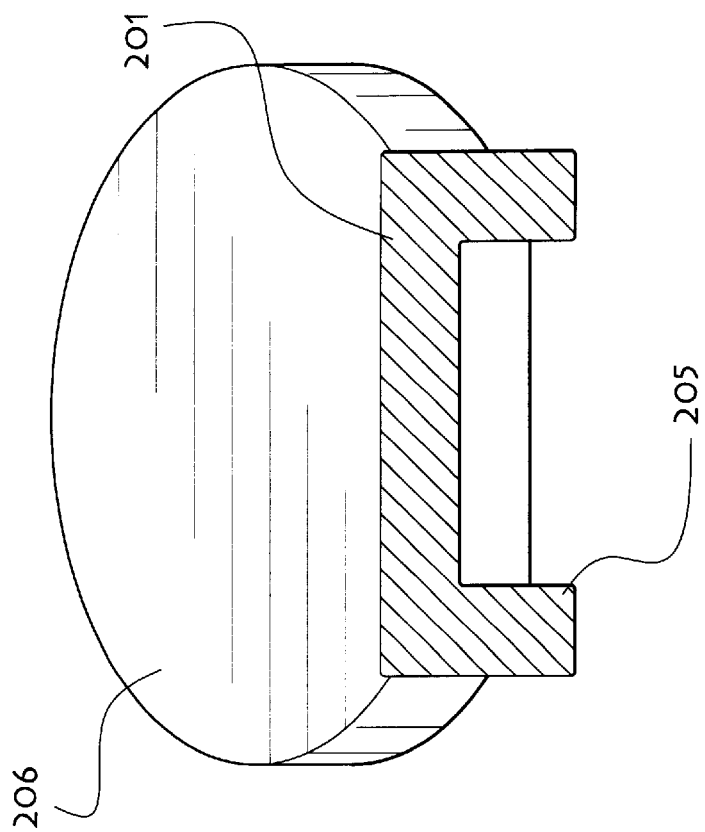
FIG. 6 is a cross-sectional view of the motorcycle support brace taken along line 6—6 of FIG. 3.
Figure 5:
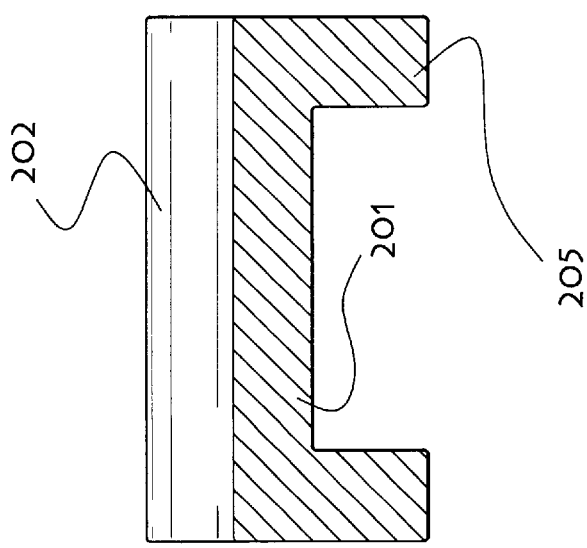
FIG. 5 is a cross-sectional view of the motorcycle support brace taken along line 5—5 of FIG. 3.

FIG. 3 shows the brace 200 as a generally flat elongated steel beam 201 which is formed with a curve 202 defining a hook 204 at one end of the beam 201. A generally flat, circular, disk-shaped footpad 206 is formed at a second end of the beam 201. The footpad 206 is formed at a thirty degree angle to the beam 201. A pair of strengthening ribs 205 are formed along the sides of the elongated beam 201, making the central portion of the brace U-shaped in cross section as best seen in FIGS. 5 and 6. Each rib extends from a location on the beam 201 adjacent to the hook 204 along the beam 201 to a location on the second end of the beam 201 adjacent the footpad 206.

As best shown in FIG. 3, the end of the rib 205 adjacent to the footpad 206 is spaced approximately 0.1003 inches from the footpad 206. The hook 204 is shaped to conform to the outer circumference of the tubular lower portions 102, 103 of the frame of a motorcycle 100. See FIGS. 1 and 2.

When the brace 200 is put into use, the footpad 206 will make flush contact with a level hard surface such as a garage floor or level driveway. The motorcycle is tipped back to the left for removal of the brace 200 so that the brace 200 can be stored on the motorcycle 100 or placement in some other storage area for later use.

It is to be understood that any number and size of ribs may be used in carrying out the invention, and that the invention is not limited to the embodiments described above, but encompasses any and all embodiments within the scope of the following claims.

I claim:

1. A lean-right motorcycle support brace of one-piece construction, comprising:

a generally flat elongated beam;

said beam having a curved portion formed at one end, a generally flat circular disk-shaped footpad formed on a second end of said beam, and elongated strengtheners formed along the longitudinal extent of said beam, and extending from a point adjacent said curved portion of said beam to a point adjacent said second end of said beam, wherein said beam is U-shaped in cross-section between the curved portion and the footpad and said strengtheners are in the form of ribs formed along the sides of the beam to make the beam U-shaped in cross-section;

wherein the diameter of said footpad is greater than the width of said beam; and said curved portion is shaped to conform to the outer circumference of tubular frame portions on the underside of a motorcycle.

2. The support brace according to claim 1, wherein said generally flat disk-shaped footpad is formed at a thirty degree angle to the beam.

3. The support brace according to claim 2, wherein a space of 0.1003 inches is provided between the footpad and an adjacent end of said ribs.

4. The support brace according to claim 1 wherein said brace is structured and configured to support up to 800 pounds of lean weight.

5. A lean-right motorcycle support brace comprising:

a generally flat elongated beam;

said beam having a curved portion formed at one end, a generally flat circular disk-shaped footpad formed on a second end of said beam and elongated strengtheners formed along the longitudinal extent of said beam; said strengtheners extending from a point adjacent said curved portion of said beam to a point adjacent said second end of said beam; wherein the diameter of said footpad is greater than the width of said beam, said footpad is formed at a thirty degree angle to the beam, said curved portion is shaped to conform to the outer circumference of tubular frame portions on the underside of a motorcycle, and said support brace is a one-piece steel construction.

* * * * *